(12) United States Patent
Pang

(10) Patent No.: US 7,047,324 B2
(45) Date of Patent: May 16, 2006

(54) SYSTEM AND METHOD OF OPERATION INFORMATION COLLECTION FOR CD-ROM DRIVES

(75) Inventor: Chia-Yuan Pang, Taipei (TW)

(73) Assignee: Lite-On It Corporation, Taipei (TW)

( * ) Notice: Subject to any disclaimer, the term of this patent is extended or adjusted under 35 U.S.C. 154(b) by 257 days.

(21) Appl. No.: 10/674,146

(22) Filed: Sep. 29, 2003

(65) Prior Publication Data
US 2004/0193749 A1    Sep. 30, 2004

(30) Foreign Application Priority Data
Mar. 12, 2003    (TW) .............................. 92105338 A

(51) Int. Cl.
*G06F 3/00*    (2006.01)

(52) U.S. Cl. .......................... 710/15; 710/62; 369/53.1

(58) Field of Classification Search ................ 710/100, 710/15–19, 33–38, 62; 713/600; 714/9, 714/41; 386/95; 369/30–47, 53.1
See application file for complete search history.

(56) References Cited

U.S. PATENT DOCUMENTS

| | | | | |
|---|---|---|---|---|
| 5,438,675 A | * | 8/1995 | Fujioka | 714/9 |
| 5,630,111 A | * | 5/1997 | Yoshida | 713/600 |
| 6,408,406 B1 | * | 6/2002 | Parris | 714/41 |
| 6,779,052 B1 | * | 8/2004 | Hatano | 710/33 |
| 2002/0002645 A1 | * | 1/2002 | Halano | 710/100 |
| 2003/0210700 A1 | * | 11/2003 | Chen | 370/401 |
| 2004/0170168 A1 | * | 9/2004 | Dedek | 370/389 |
| 2004/0247034 A1 | * | 12/2004 | Zhong et al. | 375/240.29 |

* cited by examiner

*Primary Examiner*—Christohper Shin
(74) *Attorney, Agent, or Firm*—Thomas, Kayden, Horstemeyer & RIsley

(57) ABSTRACT

A system and method of operation information collection for CD-ROM drives. The system includes a CD-ROM drive system, a reception device and a computer host. The CD-ROM drive system outputs operation information to the reception device through a serial communication interface according to a start transmission signal. The reception device stores the operation information in storage, and transmits the operation information to the computer host in real time, or selectivity, transmits all received operation information to the computer host at a time according to a trigger, such that he computer host can analyze the operation information and perform related operations.

10 Claims, 6 Drawing Sheets

SYSTEM AND METHOD OF OPERATION INFORMATION COLLECTION FOR CD-ROM DRIVES

BACKGROUND OF THE INVENTION

1. Field of the Invention

The present invention relates to a system and method of operation information collection for CD-ROM drives, and particularly to a system and method that receives operation information of a CD-ROM drive via a specific reception device and forwards it to a computer host for analysis.

2. Description of the Related Art

During the production or repair of CD-ROM drives, since there are no effective and useful tools or information for analysis, it is time-consuming for engineers to check all of the hardware components and software of the CD-ROM drive to isolate the problem.

FIG. 1 illustrates a conventional mechanism of information collection between a CD-ROM drive system and a computer host. As shown in FIG. 1, the CD-ROM drive system 11 uses a UART (Universal Asynchronous Receiver/Transmitter) interface to output related information to the computer host 13 via a RS 232C interface 12. Since the transmission rate of the RS 232C interface 12 is below 115K (bit/sec) (about 1843200/16), a micro-controller or program of the CD-ROM drive system 11 uses at least 10(byte)*10(bit/byte)*1/115K(sec/bit)=0.9 ms waiting for the transmission of the UART interface if the CD-ROM drive system 11 transmits 10 bytes of information at a time.

In some devices with high speed processing, such as 40X CD-ROMs, the processing time for a data block is 1/75/40=0.3 ms, and the CD-ROM drive system 11 will work abnormally if the program needs 0.9 ms in transmission. In addition, since the reception speed and the processing speed of information between the CD-ROM drive system 11 and the computer host 11 are not consistent, some information may be lost during the transmission, so as to influence the analysis result.

SUMMARY OF THE INVENTION

It is therefore an object of the present invention to provide a system and method that receives operation information of a CD-ROM drive via a specific reception device and forwards it to a computer host for analysis.

To achieve the above object, the present invention provides a system of operation information collection for CD-ROM drives. The system includes a CD-ROM drive system, a reception device and a computer host. The CD-ROM drive system outputs operation information to the reception device through a serial communication interface according to a start transmission signal from the reception device. The reception device stores the operation information in storage, and transmits the operation information to the computer host in real time, or selectivity, transmits all received operation information to the computer host at a time according to a trigger. The computer host may analyze the operation information and perform related operations.

The reception device according to the embodiment of the present invention includes a reception port to receive the operation information, storage, a switch, an output port and a micro-controller. The micro-controller sends the start transmission signal to the CD-ROM drive system through the reception port, receives the operation information from the CD-ROM drive system, and stores the operation information in the storage. The micro-controller can transmit the operation information to the computer host through the output port in real time, or transmit all received operation information to the computer host at a time according to a trigger of the switch.

BRIEF DESCRIPTION OF THE DRAWINGS

The aforementioned objects, features and advantages of the invention will become apparent by referring to the following detailed description of the preferred embodiment with reference to the accompanying drawings, wherein.

DETAILED DESCRIPTION OF THE INVENTION

Figure 1:
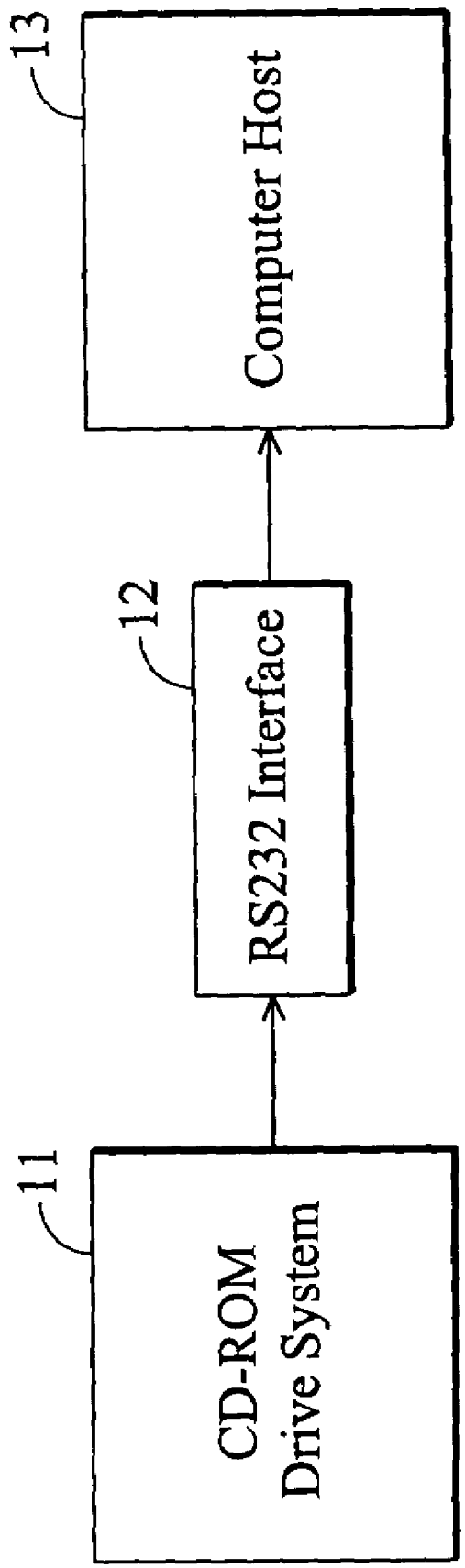
FIG. 1 is a schematic diagram illustrating a conventional mechanism of information collection between a CD-ROM drive system and a computer host.
Figure 2:
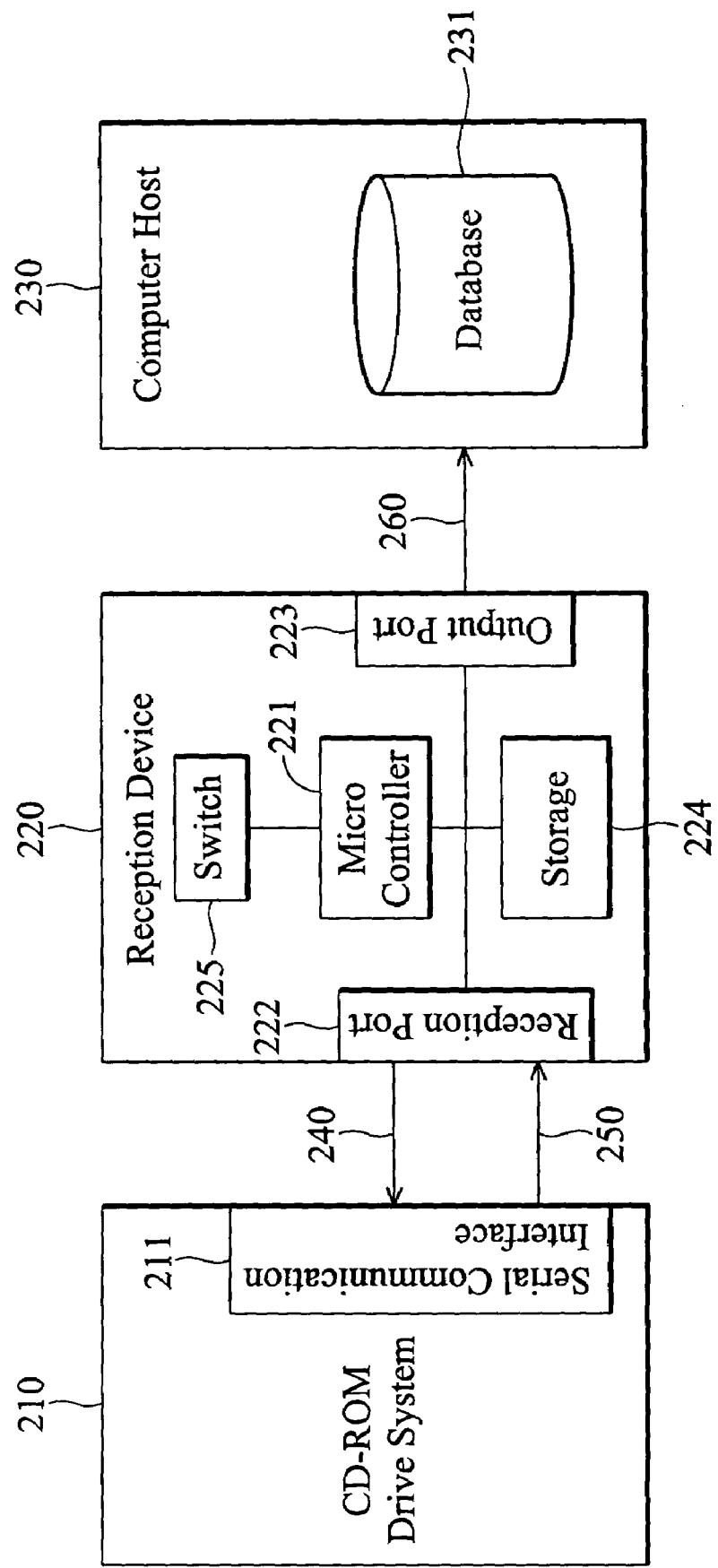
FIG. 2 is a schematic diagram illustrating the architecture of the system of operation information collection for CD-ROM drives according to the embodiment of the present invention.

FIG. 2 illustrates the architecture of the system of operation information collection for CD-ROM drives according to the embodiment of the present invention. The system includes a CD-ROM drive system 210, a reception device 220 and a computer host 230.

The CD-ROM drive system 210 includes a serial communication interface 211. The serial communication interface 211 may be a UART interface, an I²C (Inter-Integrated Circuit) bus interface, or a synchronous mode interface.

Figure 3:
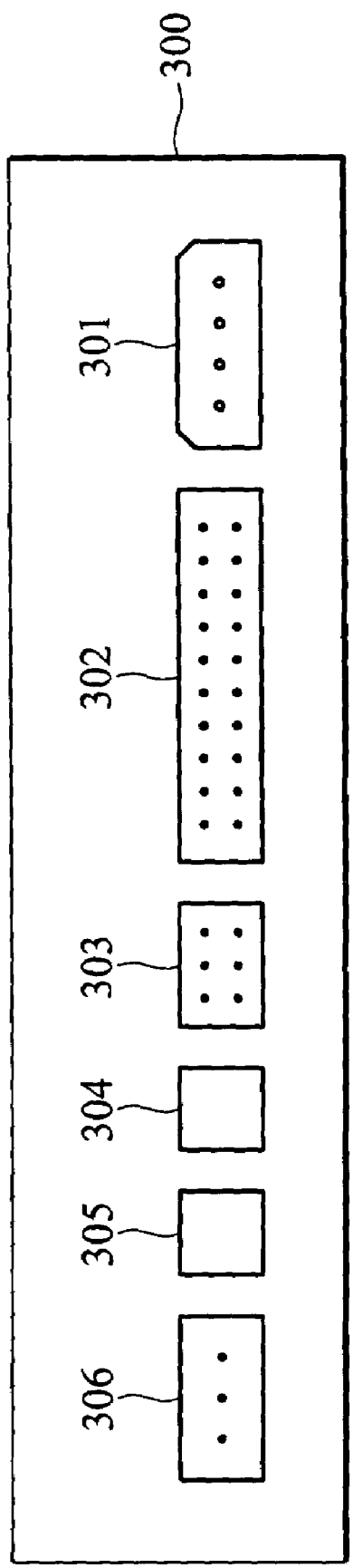
FIG. 3 is a schematic diagram illustrating the connection port of CD-ROM drive.

FIG. 3 illustrates the connection port of a CD-ROM drive 300. As shown in FIG. 3, the connection port of the CD-ROM drive 300 includes a power connection port 301, an IDE interface connection port 302, master/slaver setting pins 303, an analog audio output port 304, a digital audio pins 305 and a data output port 306. The data output port 306 is the serial communication interface 211, one of the UART interface, the I²C bus interface, and the synchronous mode interface.

The CD-ROM drive system 210 can receive a start transmission signal or a stop transmission signal from the reception device 220 through the serial communication interface 211. Note that the transmission of the signals can be controlled by the reception device 220 according to the level of a specified pin or switch. For example, the start transmission signal is sent to the CD-ROM drive system 210 if the specified pin is switched to high level, and the stop transmission signal is sent to the CD-ROM drive system 210 if the specified pin is switched to low level.

The CD-ROM drive system 210 outputs operation information to the reception device 220 through the serial communication interface 211 if the start transmission signal is received, and stops the transmission if the stop transmission signal is received. It should be noted that if the serial communication interface 211 is the UART interface, the serial communication interface 211 includes three pins, one to receive the start transmission signal and the stop transmission signal, one to output the operation information, and one to connect ground. In addition, the operation information may be detailed system logs of the CD-ROM drive system 210 during operation.

The reception device 220 includes a micro-controller 221, a reception port 222, an output port 223, storage 224, and a switch 225. It should be noted that the reception device 220 may be an adapter card or a device connected outside of a host. The micro-controller 221 sends the start transmission signal or the stop transmission signal (240) to the CD-ROM drive system 210 through the reception port 222 according to the specified pin or switch described above. The micro-controller 221 receives the operation information (250) from the CD-ROM drive system 210, and stores the operation information in the storage 224. The storage 224 may be a FIFO (First In First Out) memory, such as SRAM, or others.

The micro-controller 221 can transmit the operation information to the computer host 230 through the output port 223 in real time, or transmit all received operation information in the storage 224 to the computer host 230 at a time according to a trigger of the switch 225. That is, according to the state of the switch 225, the micro-controller 221 can forward the operation information to the computer host 230 in real time, or store the received operation information in the storage 224 in order, and transmit all of them to the computer host 230 at a time when the transmission finishes. It should be noted that the reception device 220 in the embodiment receives the operation information of the CD-ROM drive system 210, however, the reception device 220 according to the present invention can receive information for any device with a serial communication interface.

The computer host 230 includes database 231 storing analysis information corresponding to the operation information. When the operation information is received from the reception device 220, the computer host 230 may analyze the operation information using the database 231 and perform related operations.

Figure 4:
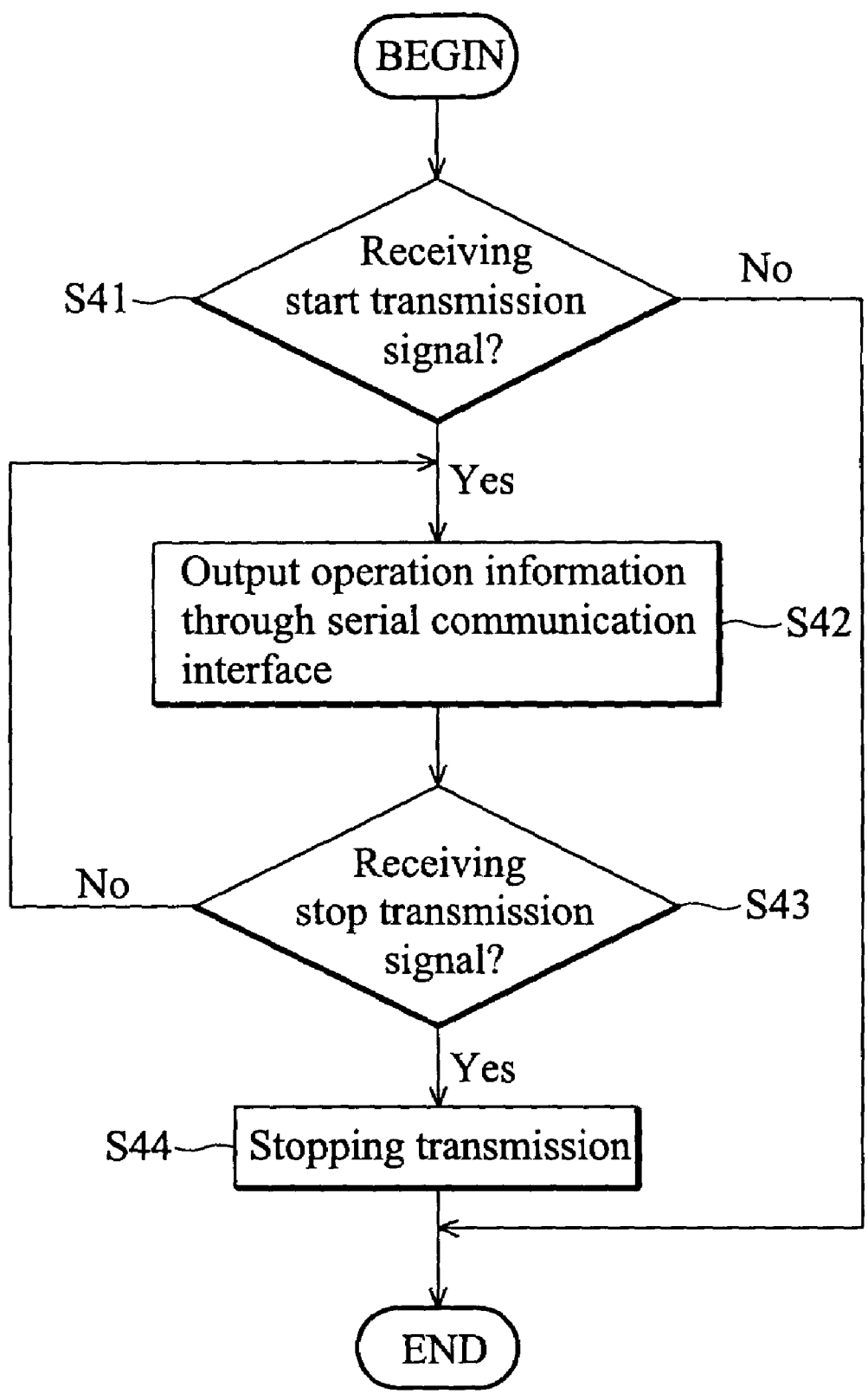
FIG. 4 is a flowchart showing the operation of CD-ROM drive system according to the embodiment of the present invention.

FIG. 4 shows the operation of the CD-ROM drive system 210 according to the embodiment of the present invention. First, in step S41, the CD-ROM drive system 210 checks whether the start transmission signal is received. If not, the process finishes. If the start transmission signal is received (Yes in step S41), in step S42, the CD-ROM drive system 210 outputs operation information to the reception device 220 through the serial communication interface 211

Thereafter, in step S43, the CD-ROM drive system 210 checks whether the stop transmission signal is received. If not (No in step S43), the flow returns to step S42, and the CD-ROM drive system 210 continues to output operation information. If so (Yes in step S43), in step S44, the CD-ROM drive system 210 stops the transmission.

Figure 5:
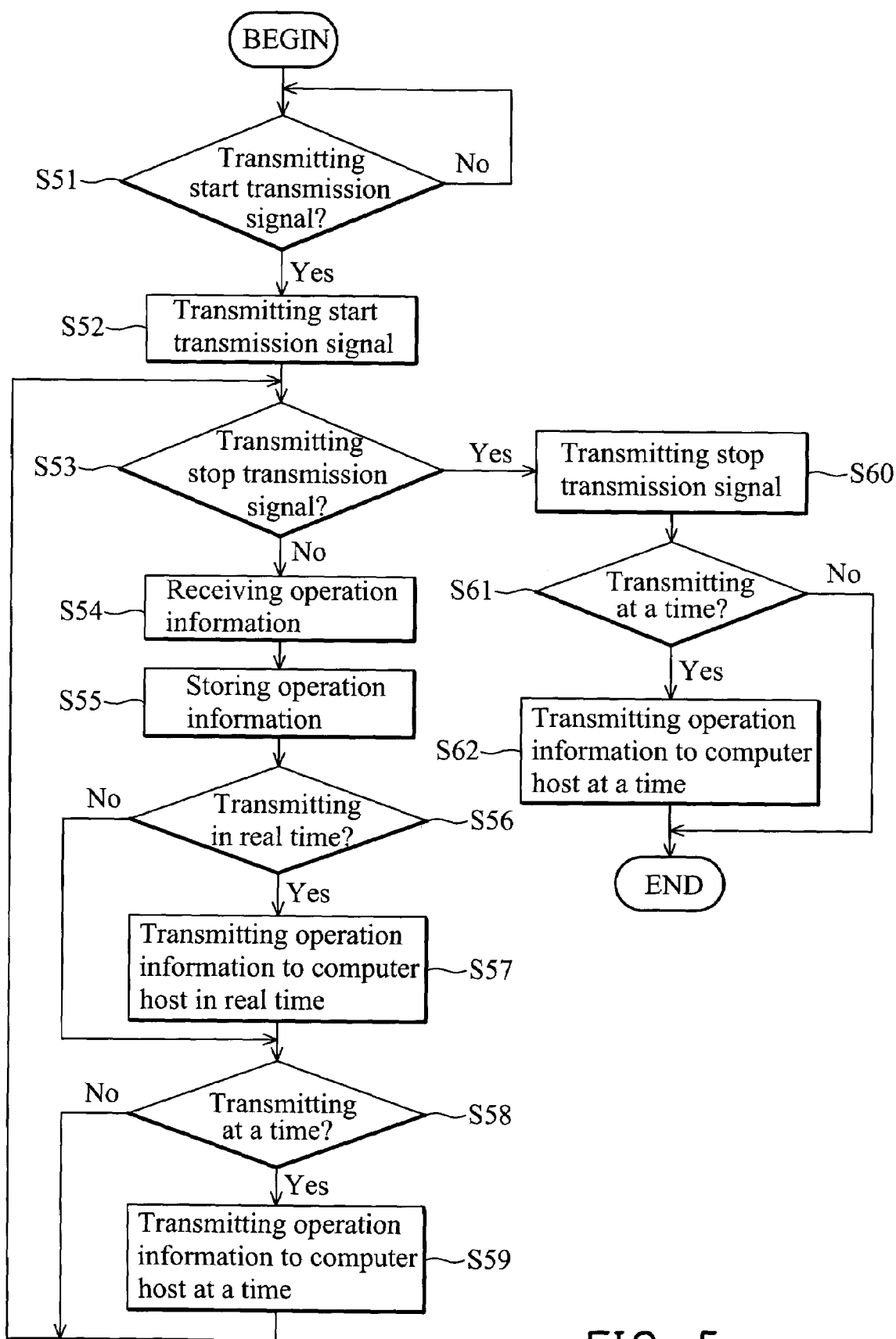
FIG. 5 is a flowchart showing the operation of reception device according to the embodiment of the present invention.

FIG. 5 shows the operation of the reception device 220 according to the embodiment of the present invention. First, in step S51, the reception device 220 checks the specified pin to determine if the start transmission signal needs to be transmitted. If not, the flow stays in step S51. If so (Yes in step S51), in step S52, the reception device 220 transmits the start transmission signal through the reception port 222.

Then, in step S53, the reception device 220 checks the specified pin to determine if the stop transmission signal needs to be transmitted. If not (No in step S53), in step S54, the reception device 220 receives operation information from a target device, such as the CD-ROM drive system 210 in the embodiment through the reception port 222, and in step S55, the reception device 220 stores the received operation information in the storage 224.

Thereafter, in step S56, the reception device 220 checks the state of the switch 225 to determine if the operation information needs to be transmitted in real time. If so (Yes in step S56), in step S57, the reception device 220 transmits the received operation information to the computer host 230 in real time. If not (No in step S56), in step S58, the reception device 220 checks the state of the switch 225 to determine if the operation information needs to be transmitted at a time. If so (Yes in step S58), in step S59, the reception device 220 transmits all the received operation information in the storage 224 to the computer host 230 at a time, and then the flow returns to step S53. If not (No in step S58), the flow returns to step S53.

If the stop transmission signal needs to be transmitted (Yes in step S53), in step S60, the reception device 220 transmits the stop transmission signal through the reception port 222. Then, in step S61, the reception device 220 checks the state of the switch 225 to determine if the operation information needs to be transmitted at a time. If so (Yes in step S61), in step S62, the reception device 220 transmits all the received operation information in the storage 224 to the computer host 230 at a time.

Figure 6:
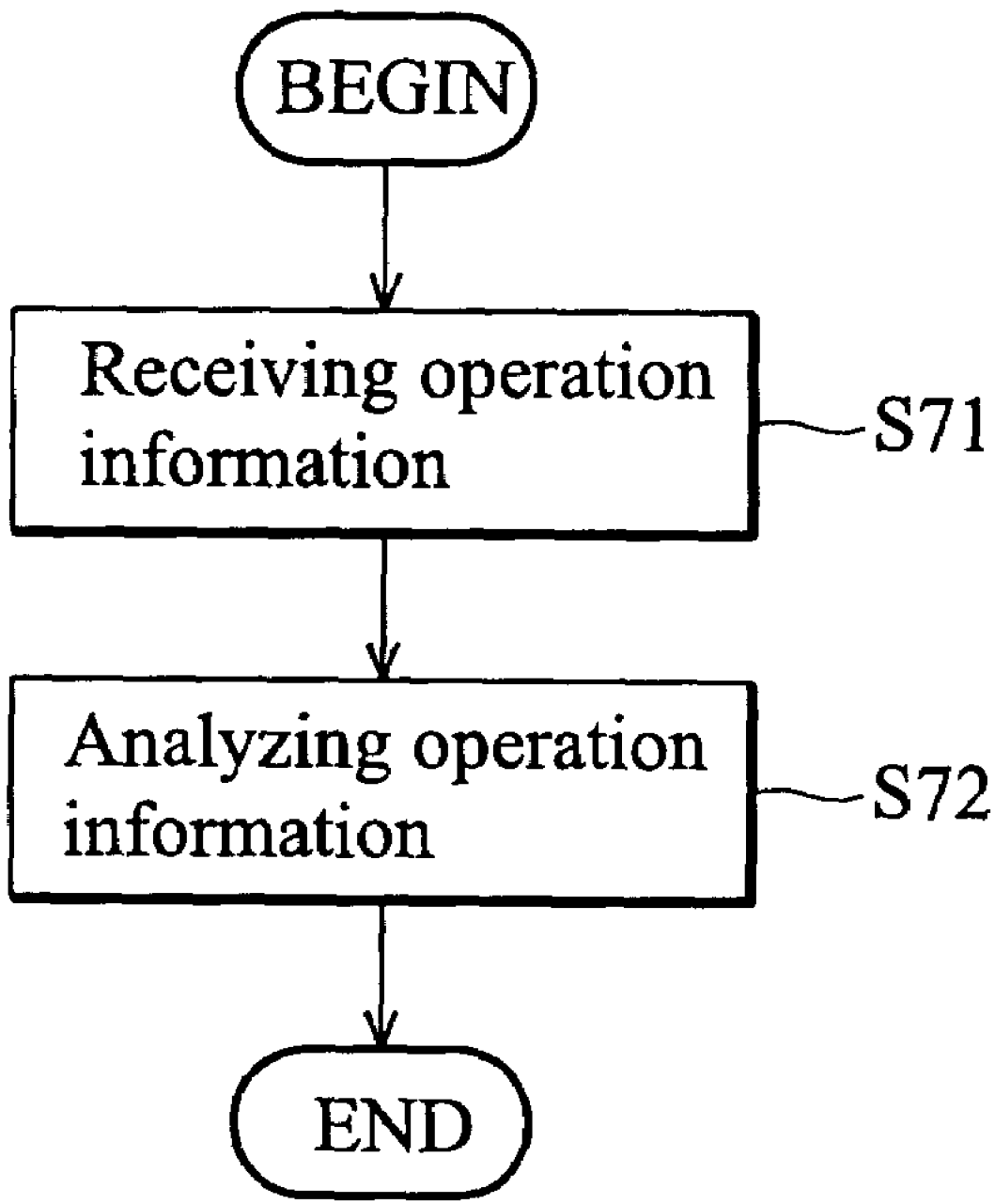
FIG. 6 is a flowchart showing the operation of computer host according to the embodiment of the present invention.

FIG. 6 shows the operation of a computer host according to the embodiment of the present invention. First, in step S71, the computer host 230 receives the operation information from the reception device 220. Then, in step S72, the computer host 230 analyzes the operation information using the database 231 and performs related operations.

As a result, using the system and method of operation information collection for CD-ROM drives according to the present invention, the operation information of a CD-ROM drive or related devices can be collected by the reception device and forwarded to a computer host for analysis.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system of operation information collection for CD-ROM drives, comprising:
    a CD-ROM drive system having a serial communication interface through which to output operation information; and
    a reception device having a reception port connected to the serial communication interface, the reception device also having storage to receive the operation information from the serial communication interface of the CD-ROM drive and to store the operation information, wherein the reception device has an output port for transferring the operation information to a computer host for analysis.

2. The system of operation information collection for CD-ROM drives as claimed in claim 1 wherein the reception device further transmits a start transmission signal to the CD-ROM drive system, and the CD-ROM drive system outputs the operation information to the reception device through the serial communication interface.

3. The system of operation information collection for CD-ROM drives as claimed in claim 1 wherein the reception device further transmits the operation information to a computer host for analysis through the output port in real time.

4. The system of operation information collection for CD-ROM drives as claimed in claim 1 wherein the reception device further comprises a switch, and transmits the operation information in the storage to a computer host for analysis through an output port according to the switch.

5. The system of operation information collection for CD-ROM drives as claimed in claim 1 wherein the serial communication interface is a UART (Universal Asynchronous Receiver/Transmitter) interface, an $I^2C$ (Inter-Integrate Circuit) bus interface, or a synchronous mode interface.

6. A method of operation information collection for CD-ROM drives, comprising the steps of:
   output of operation information through a serial communication interface by a CD-ROM drive system;
   reception of the operation information from the serial communication interface of the CD-ROM drive system by a reception device; and
   storing the operation information in storage of the reception device, wherein the reception device has an output port for transferring the operation information to a computer host for analysis.

7. The method of operation information collection for CD-ROM drives as claimed in claim 6 further comprising the steps of:
   transmission of a start transmission signal by the reception device;
   reception of the start transmission signal by the CD-ROM drive system; and
   output of the operation information through the serial communication interface by the CD-ROM drive system.

8. The method of operation information collection for CD-ROM drives as claimed in claim 6 further transmitting the operation information to a computer host for analysis through the output port by the reception device in real time.

9. The method of operation information collection for CD-ROM dives as claimed in claim 6 further comprising triggering a switch of the reception device, and transmission of the operation information in the storage to a computer host for analysis through an output port by the reception device according to the trigger.

10. The method of operation information collection for CD-ROM drives as claimed in claim 6 wherein the serial communication interface is a UART (Universal Asynchronous Receiver/Transmitter) interface, an $I^2C$ (Inter-Integrate Circuit) bus interface, or a synchronous mode interface.

* * * * *